United States Patent [19]
Tanigawa et al.

[11] Patent Number: 5,701,864
[45] Date of Patent: Dec. 30, 1997

[54] ENERGY TRANSFORMATION METHOD AND ITS SYSTEM FOR PISTON RECIPROCATING CYCLE

[76] Inventors: Hiroyasu Tanigawa; Kazunaga Tanigawa, both of 428-35, Enami, Okayama-shi, Okayama-ken, Japan

[21] Appl. No.: 608,148

[22] Filed: Feb. 28, 1996

[51] Int. Cl.$^6$ ............................................... F02B 19/04
[52] U.S. Cl. ........................................ 123/290; 123/291
[58] Field of Search ............................ 123/283, 289, 123/290, 291, 257, 286

[56] References Cited

U.S. PATENT DOCUMENTS

| | | | |
|---|---|---|---|
| 1,620,124 | 3/1927 | Nielsen | 123/289 X |
| 2,187,857 | 1/1940 | Kammer | 123/291 X |
| 2,197,106 | 4/1940 | Kammer | 123/286 X |
| 5,372,115 | 12/1994 | Straub et al. | 123/1 A X |
| 5,375,580 | 12/1994 | Stolz et al. | 123/527 |

FOREIGN PATENT DOCUMENTS

214637  2/1925  United Kingdom ............. 123/290

*Primary Examiner*—Tony M. Argenbright
*Attorney, Agent, or Firm*—Knobbe, Martens, Olson & Bear, LLP

[57] ABSTRACT

An energy transformation method and a system for carrying out this method which are capable of improving the energy transformation efficiency upon transforming the thermal energy to kinetic rotating energy, and improving the thermal efficiency, while at the same time reducing environmental pollution by purifying the exhaust gas and/or enhancing unit power, whatever the number of cycles or the type of ignition. The present energy transformation method and the system for carrying out this method can change the non-constant volume combustion of the prior art, which is caused by the rapid increase in the combustion chamber volume due to the downward movement of the piston immediately after the piston passes through TDC, to a substantially constant volume combustion which is attained by isolating substantially the combustion chamber through TDC, whereby the combustion pressure can keep on increasing until the completion of such substantially constant volume combustion. As a result, maximum combustion pressure occurs when the piston passes through TDC.

13 Claims, 5 Drawing Sheets

ENERGY TRANSFORMATION METHOD AND ITS SYSTEM FOR PISTON RECIPROCATING CYCLE

TECHNICAL FIELD

The present invention generally relates to an energy transformation method and a system for carrying it out utilizing a piston reciprocating cycle, and in particular, relates to an energy transformation method and its system which increases the energy transformation efficiency upon transforming thermal energy to kinetic rotating energy by means of a reciprocating piston, and which improves thermal efficiency, while at the same time reducing environmental pollution and/or enhancing unit power.

BACKGROUND OF THE INVENTION

Japanese Patent Laid-Open Publication HEI 06-248951 discloses an internal combustion engine wherein fuel is combusted in a cylinder so as to reciprocate a piston provided therein. When the piston is raised near the TDC (Top Dead Centre), a protrusion portion formed on the upper portion of the piston is fitted into a recess formed on the top inner section of the cylinder to form a plurality Of chambers which are separated from one another in such a manner that the interior of the cylinder is divided into two areas, that is, the inside of the recess and the outside thereof. According to such an internal combustion engine, combustion takes place substantially in two stages in the cylinder, which enables the quantity of combustible material like CO and the quantity of NOx contained in the exhaust gas to be reduced simultaneously.

Japanese Patent Laid-Open Publication HEI 05-263645 discloses a combustion chamber of an internal combustion engine wherein a pedestal portion is provided on the top of a piston to throttle a fluid channel between a sub-chamber and a main combustion chamber formed on the upper portion of the piston, while at the same time a plurality of communicating holes are provided which penetrate the narrowed fluid channel diagonally and radially. Due to such a combustion chamber, a swirl flow of air in the sub-chamber is mixed with injected fuel during a compression stroke, and a flame blowing out from the sub-chamber passes through the diagonal communicating holes to be mixed with the air, followed by a good combustion during the combustion stroke being effected.

Similarly, Japanese Patent Laid-Open Publication HEI 05-288058 discloses a combustion chamber of an internal combustion engine wherein a protrusion is provided on the top of a piston to close an opening of a sub-chamber and narrow grooves and recess grooves are provided on the lower end of an opening portion of the sub-chamber and a protrusion portion of the piston, respectively, by notching respective corners. Each narrow groove cooperates with the corresponding recess groove to form a narrow communicating fluid channel. This communicating fluid channel enables combustion in the closed sub-chamber to be effected in such a manner that NOx produced at the beginning of combustion is reduced, subsequently enabling the flame passing from the sub-chamber via the communicating fluid channel to a main-chamber, to reach the periphery edge of the main-chamber and be mixed with the swirl flow of new air to effect a good combustion.

Furthermore, Japanese Patent Publication HEI 07-74614 discloses a four cycle hydrogen internal combustion engine comprising an auxiliary piston and an auxiliary cylinder which synchronize a main piston and a main cylinder, respectively, and are movable with respect to each other in a same phase, wherein a cylinder chamber is formed to be varied in size between a minimum cylinder chamber at TDC and a maximum cylinder chamber at BDC(Bottom Dead Centre) by the auxiliary piston and the auxiliary cylinder, and the minimum cylinder chamber is made to communicate with a minimum main-cylinder chamber via a passage so that the cylinder chamber is filled with hydrogen during the intake stroke. Due to such a hydrogen internal combustion engine, the problem of premature ignition can be eliminated without formation of an interior fuel mixture at the latter stage of a compression stroke.

Incidentally, the Otto cycle (constant volume cycle) is known as a theoretical cycle for a reciprocating piston wherein air is compressed in an insulated manner during the compression stroke, then an amount of heat $Q_1$ is fed into the cycle under a constant volume during the combustion stroke, next fuel mixture is expanded in an insulated manner during the expansion stroke, and then an amount of heat $Q_2$ is taken away from the cycle under the constant volume during the exhaust stroke. The thermal efficiency $\eta_{th}$ is expressed by the following equation. wherein;

$$\eta_{th}=1-(Q_2/Q_1)=1-1/\epsilon^{\kappa-1} \quad (1)$$

wherein;
$Q_1$: amount of heat fed into the cycle, that is, amount of received heat
$Q_2$: amount of heat dissipated from the cycle
$\epsilon$: ratio of compression
$\kappa$: ratio of specific heat In the above-equation (1), it is required to increase $\epsilon$ and/or $\kappa$ in order to improve $\eta_{th}$.

However, the Otto cycle is established under a first condition that the amount of heat fed, that is combustion of fuel, is effected instantly at TDC of the piston( constant volume combustion), and a second condition that there exists no factor of loss associated with the cycle.

Figure 1:
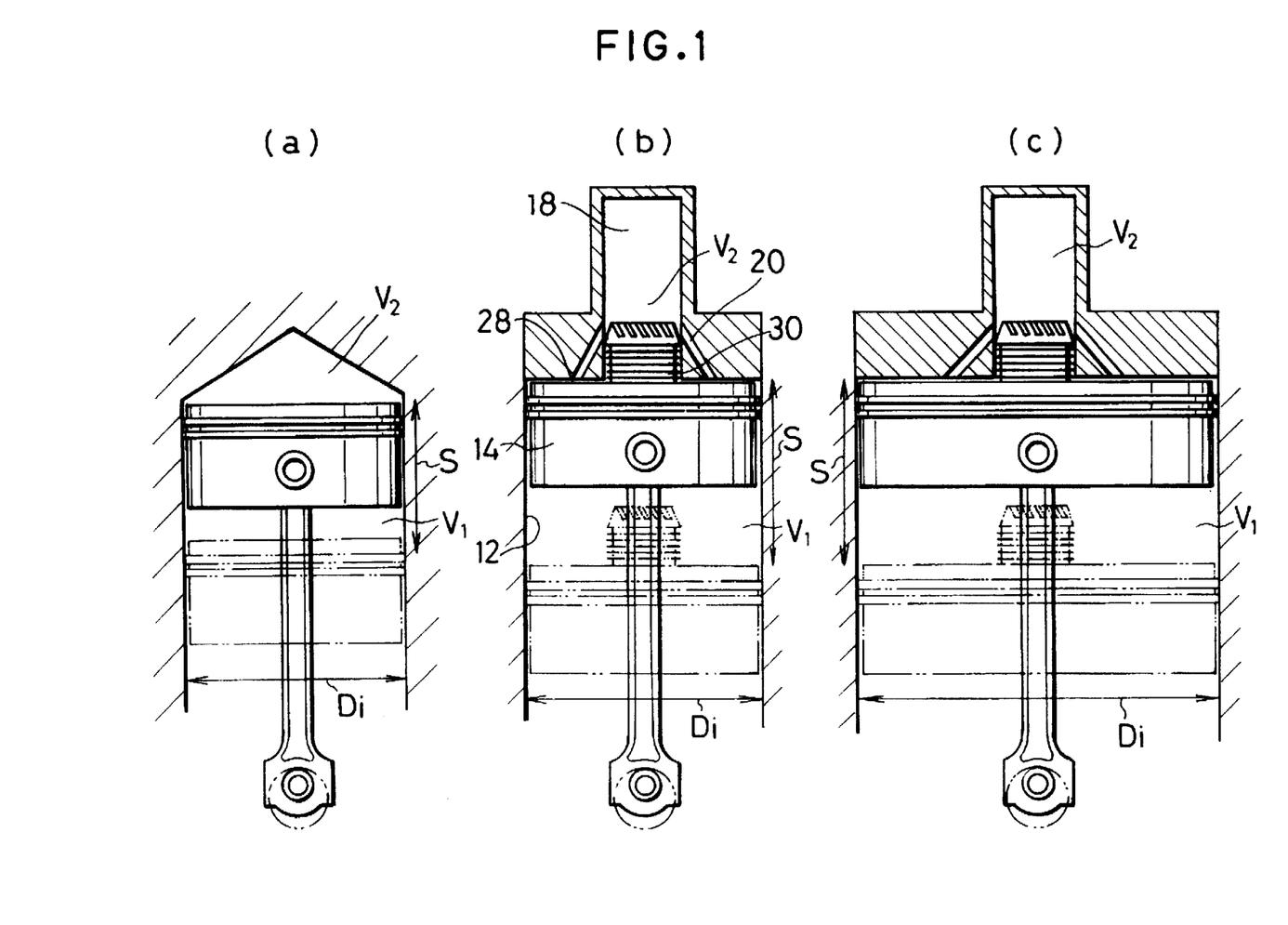
FIG. 1 is a schematic view showing a basic concept of a embodiment of the invention.

In connection with the first condition, as shown in FIG. 1(a), a combustion chamber is defined by the inner surface of the cylinder head and the upper surface of the piston and the combustion term(heat developing term) is ideally required to be within a certain range of a crank angle between approximately 40 deg to 60 deg in an actual cycle. Since the combustion chamber volume increases rapidly due to the downward movement of the piston from TDC, the combustion is forced to be effected under the condition that a combustion chamber is communicated with the inside of a cylinder. As a result, non-constant volume combustion can be caused. Such a non-constant volume combustion causes the combustion pressure and the combustion temperature to be lowered very rapidly, thereby causing NOx and non-combusted fuel to be produced.

On the other hand, in a case where combustion is completed at TDC of the piston instantaneously, like in the case of an Otto cycle, the transformation efficiency upon transforming the thermal energy produced by the combustion of fuel to kinetic rotating energy of a crankshaft is greatly worsened. In other words, as shown in FIG. 1(a), a connecting rod which connects the crankshaft to the piston becomes parallel with the moving direction of the piston when the piston is at TDC, so that the crankshaft cannot be rotated even if combustion pressure acts on the upper face of the piston so as to force it down, whereby energy loss may occur.

Accordingly, whatever the number of the cycles or type of ignition is, it is greatly desired to provide a cycle which is capable of improving the transformation efficiency upon transforming the thermal energy to kinetic rotating energy by maintaining the combustion through a certain crank angle range after TDC and by shifting the crank angle position, where a maximum combustion pressure or a maximum combustion temperature occurs, from TDC position.

In connection with the second condition, since a cooling loss, exhaust loss and mechanical loss are inevitable in an actual cycle, minimizing such losses is a siginificant factor for preventing the thermal efficiency from being lowered.

Especially, as to the cooling loss, the smaller the stroke volume becomes, the bigger S/V (surface/volume) value becomes. As a result, the thermal efficiency is reduced under the constant compression ratio.

On the other hand, as to the mechanical loss, the larger the stroke volume becomes, the higher, generally, the combustion pressure becomes, so that the friction loss between the piston and the ring and the bearing load of the crankshaft are increased.

Accordingly, with respect to the reduction of such losses to prevent the thermal efficiency from being lowered, whether the important factor for accomplishing this is the cooling loss or the mechanical loss depends on the engine size.

In view of the above two conditions, the problems resulting from improving the thermal efficiency, especially the ones in connection with purifying the exhaust gas or increasing the unit power in an actual piston reciprocating cycle, will be hereinafter described in detail, in accordance with the type of the fuel ignition or the number of cycles.

Firstly, in a spark ignition, the problem of knocking is caused due to an increase in the compression ratio. In this respect, so-called lean-burn or EGR enables the ratio of specific heat to be enhanced and the cooling loss to be reduced without increasing the compression ratio so that the thermal efficiency can be improved, while at the same time NOx can be reduced by lowering the combustion temperature. However, lean-burn or EGR may cause unstable combustion such as a variation of combustion in each cycle, and as a result, the discharge amount of HC may also be augmented. In order to prevent such an unstable combustion, a so-called squish or swirl is required to develope turbulence in the combustion chamber or to effect a stratified charge around a spark plug.

On the other hand, in the case of compression ignition, as compared with the above spark ignition, even though the problem of knocking seldom arises, high temperature and high pressure air is required so that combustion pressure reaches a level several times as high as that of the spark ignition, which necessitates providing of a thick and massive structure for a cylinder and a piston, etc. Therefore, the power per unit weight is low. In addition, the power itself is low due to the inefficient utilization of air by means of fuel injection in spite of high explosion pressure. The earlier the fuel injection timing is set in order to enhance the power, the higher the temperature in the combustion chamber becomes, thereby causing NOx to be increased. On the other hand, the later the fuel injection timing is set, the greater the amount of soot produced.

Secondly, in a two-stroke cycle system as compared with a four-stroke cycle system, much more residual gas is mixed up with fresh air which the cylinder is filled with, and much more fresh new air passes from a scavenging port to an exhaust port in the former cycle even though the power per unit cylinder volume of the former is rather higher than that of the latter. The above technical matters cause the thermal efficiency to be lowered and the discharging rate of HC to be increased. Moreover, since the exhaust gas pressure of the two-stroke cycle is generally higher than that of the four-stroke cycle, the exhaust noise of the former is louder than that of the latter.

In accordance with an aspect of the present invention, specific problems arise when combustion occurs, depending on the kind of fuel, for example liquid fuel such as methanol, liquid hydrogen or gas fuel such as natural gas. In the case of methanol, which is considered to be a promising alternative fuel for diesel engines, since the cetane number is small even though it has a high octane number, it is rather difficult to ignite methanol. As a result, a non-combusted portion of the methanol tends to remain. In the case of hydrogen fuel, environmental pollution can be effectively reduced. However, premature ignition tends to occur, as described above, so that power has to be developed in all regions of the load. Moreover, natural gas easily effects a self-combustion so that it is very difficlt to obtain a high compression ratio.

As can be clearly seen from the above-description, a promising technique which is capable of improving the thermal efficiency, while at the same time reducing environmental pollution and/or enhancing unit power, irrespective of the number of cycles, the type of fuel ignition and the kind of fuel, has not been developed as yet.

Therefore, in view of the above problems, the object of the present invention is to provide an energy transformation method and a system for carrying out this method which are capable of improving the transformation efficiency upon transforming the thermal energy produced by the combustion of fuel to the kinetic rotating energy by means of a reciprocating piston, whatever the number of the cycles or the type of ignition is.

Another object of the present invention is to provide an energy transformation method and a system for carrying out this method which are capable of improving the thermal efficiency of the cycle, while at the same time reducing environmental pollution by purifying the exhaust and/or enhancing the power per weight, whatever the number of cycles or the type of ignition is.

Still another object of the present invention is to provide an energy transformation method and a system for carrying out this method which are capable of effecting stable combustion for various kinds of fuels.

SUMMARY OF THE INVENTION

The present invention, in view of the above problems, provides for an energy transformation method and a system for carrying out this method which are capable of improving combustion itself to lead to the enhancement of energy transformation efficiency and attainment of high thermal efficiency, while at the same time reducing environmental pollution and/or increasing unit power by changing the non-constant volume combustion of the prior art, which results from the rapid increase of the combustion chamber volume due to the downward movement of the piston immediately after the piston passes through TDC, to a substantially constant volume combustion which is attained by isolating substantially the combustion chamber through TDC.

The improvement of energy transformation efficiency

Firstly, the energy transformation method and the system for carrying out this method of the present invention, in a piston reciprocating cycle comprising a compression stroke, combustion stroke, expansion stroke and exhaust stroke in order, improves the non-constant volume combustion of the prior art to such an extent that it enables the thermal energy resulting from the combustion of fuel to be transformed efficiently into the kinetic rotating energy of a crankshaft connected to the piston without the useless exhaustion of the energy at the vicinity of TDC, by realizing the substantially constant volume combustion through TDC to increase the combustion pressure until the completion of such a substantially constant volume combustion, thereby shifting the piston position where the maximum combustion pressure occurs from TDC.

More specifically, the improvement of the energy transformation efficiency is achieved by the following cycle. Firstly, the piston moves up from BDC to TDC during the compression stroke, while air in the cylinder above the piston is compressed. Then, the protrusion portion of the piston is kept inserted into the reduced bore portion of the cylinder over a predetermined range of crankshaft angles after the protrusion portion reaches a level of a lower opening of the reduced bore portion, whereby the resultant reduced bore combustion chamber becomes substantially isolated from the interior of the cylinder. Then, the piston keeps on moving up toward TDC, while at the same time air between the upper face of the piston and the shoulder portion of the cylinder continues to be compressed to be pumped upward into the reduced bore combustion chamber via a one-way air channels. This enables the air pressure in the reduced bore combustion chamber to be greatly increased even if the length of the protrusion portion inserted into the reduced bore combustion chamber is shortened, or, on the contrary, the length thereof at an upper part of the reduced bore portion is lengthened.

On the other hand, fuel is injected downwardly from a fuel injection system during that time, thereby causing injected fuel to be mixed up with the highly compressed air to form a fuel mixture, followed by the fuel mixture being ignited to start combustion. On this occasion, since the reduced bore combustion chamber is kept isolated from the interior of the cylinder below the shoulder portion and the length of the protrusion portion inserted into the reduced bore portion is short, as compared with the full length of the reduced bore combustion chamber, the combustion chamber volume changing rate becomes relatively small during the isolation of the reduced bore combustion chamber, whereby the substantially constant volume combustion can be achieved. Therefore, the combustion pressure keeps on increasing until the piston descends from TDC to such an extent that its protrusion portion reaches the level of the lower opening of the reduced bore portion again, thus completing the isolation. Then, during the expansion stroke after such an isolation completion, the combustion pressure drops down very rapidly due to the fact that the reduced bore combustion chamber begins to communicate with the interior of the cylinder, and then the exhaust gas is discharged outside during the exhaust stroke.

In short, since the maximum combustion pressure can occur at the isolation completion position after TDC, the thermal energy can be transformed to the kinetic rotating energy of the crankshaft efficiently without the useless exhaustion of thermal energy resulting from the combustion.

The reduction of environmental pollution

Secondly, the achievemnt of the substantially constant volume combustion through TDC enables the combustion pressure and the combustion temperature to be prevented from being lowered before and after TDC whereby the combustion state can be improved, and an increase in the percentage of the residual gas causes lowered temperature high pressure combustion, both of which factors reduce NOx and the non-combusted portion of the fuel.

More specifically, the nearly complete combustion and rising of the temperature of the exhaust gas due to the duration of the combustion enables HC to be reduced, on the other hand, the enhancement of the percentag of the residual gas enables the combustion temperature to be reduced, which serves to reduce NOx. Furthermore, the lengthening of the combustion time enables slow combustion to be achieved so as to restrict the production of NOx due to the occurence of a local high temperature portion of the combustion chamber.

In this respect, in a two cycle-stroke, since it is generally difficult to scavenge the reduced bore combustion chamber, residual gas can be utilized still more effectively than in a four cycle-stroke, so that environmental pollution can be reduced correspondingly and reduction of noise upon completion of combustion is effectively attained.

The enhancement of the thermal efficiency

Thirdly, in the substantially constant volume combustion through TDC, in particular, as shown in FIGS. 1(a) and 1(b), in a case where the cubic capacity $V_1$ and the combustion chamber volume $V_2$ are constant under common cylinder bore Di and common stroke S, the bore of the combustion chamber is reduced and the length of the combustion chamber correspondingly lenghthened, thermal efficiency thus being enhanced due to the following reasons, even though the Compression ratio $V_1/V_2$ is constant. That is, the combustion temperature rises due to the improvement of the combustion state, and a decrease in the side surface area of the combustion chamber causes the cooling loss to be reduced, and furthermore a reduction of the friction force between the piston ring and the cylinder or a reduction of the crank bearing load causes the mechanical loss to be reduced.

Especially, as shown in FIG. 1(c), if the cylinder bore Di is enlarged, and on the other hand, the stroke S is correspondingly shortened in order to keep the cubic capacity $V_1$ constant, the dead volume will be increased whereby lean burn is enabled to contribute to the improvement of the thermal efficiency. At this time, injected fuel and highly compressed air flow into the reduced bore combustion chamber facing each other, to form a fuel mixture in the reduced bore combustion chamber, followed by generation of turbulence in the reduced bore combustion chamber. In the case of a spark ignition, stratified combustion can be realized around the spark plug to prevent the instability of combustion.

In this respect, in a case where the present invention is applied to the spark ignition, the improvement of thermal efficiency can still be achieved, while at the same time the possibility of generation of knocking can be reduced even if the compression ratio is further increased.

The enhancement of unit power

Fourthly, the achievement of the substantially constant volume combustion through TDC enables the isolation of the reduced bore combustion chamber to be ended upon the completion of combustion so that the combustion gas expands into the interior of the cylinder, and as a result, sufficiently lowered pressure can act on the entire upper surface of the piston whereby only the reduced bore portion is subject to high combustion pressure. Thus, the structural weight is prevented from increasing due to a high compression ratio so that power per unit weight can be enhanced. In this respect, particularly as to the compressed ignition type, unit power can be increased while a much higher compression ratio is achieved, because a corresponding addition of structural weight is avoided.

The improvement of combustion for various kinds of fuel

Fifthly, stable combustion for various kinds of fuel can be achieved. For instance, as to hydrogen, the above-decribed premature ignition or backfire can be reduced by effective utilization of lean burn, and even if such a premature ignition should happen, its influence can be minimized due to the reduction of the crank bearing load. Further, as to natural gas, high compression can be achieved while at the same time the generation of knocking is prevented as much as possible. In addition, as to methanol, the injection of fuel and highly compressed air in an opposing manner into the reduced bore combustion chamber where the rate of residual gas containing an active group is relatively high, enables the vaporization of the methanol to be facilitated and the longevity of the glow surface to be lenghthened.

BRIEF DESCRIPTION OF THE DRAWINGS

The above and other objects and advantages of the present invention will become apparent from the following description when read in conjuction with the accompanying drawings wherein.

DETAILED DESCRIPTION OF THE PREFERRED EMBODIMENTS

The preferred embodiment will be hereinafter described with reference to the accompanying drawings.

Figure 2:
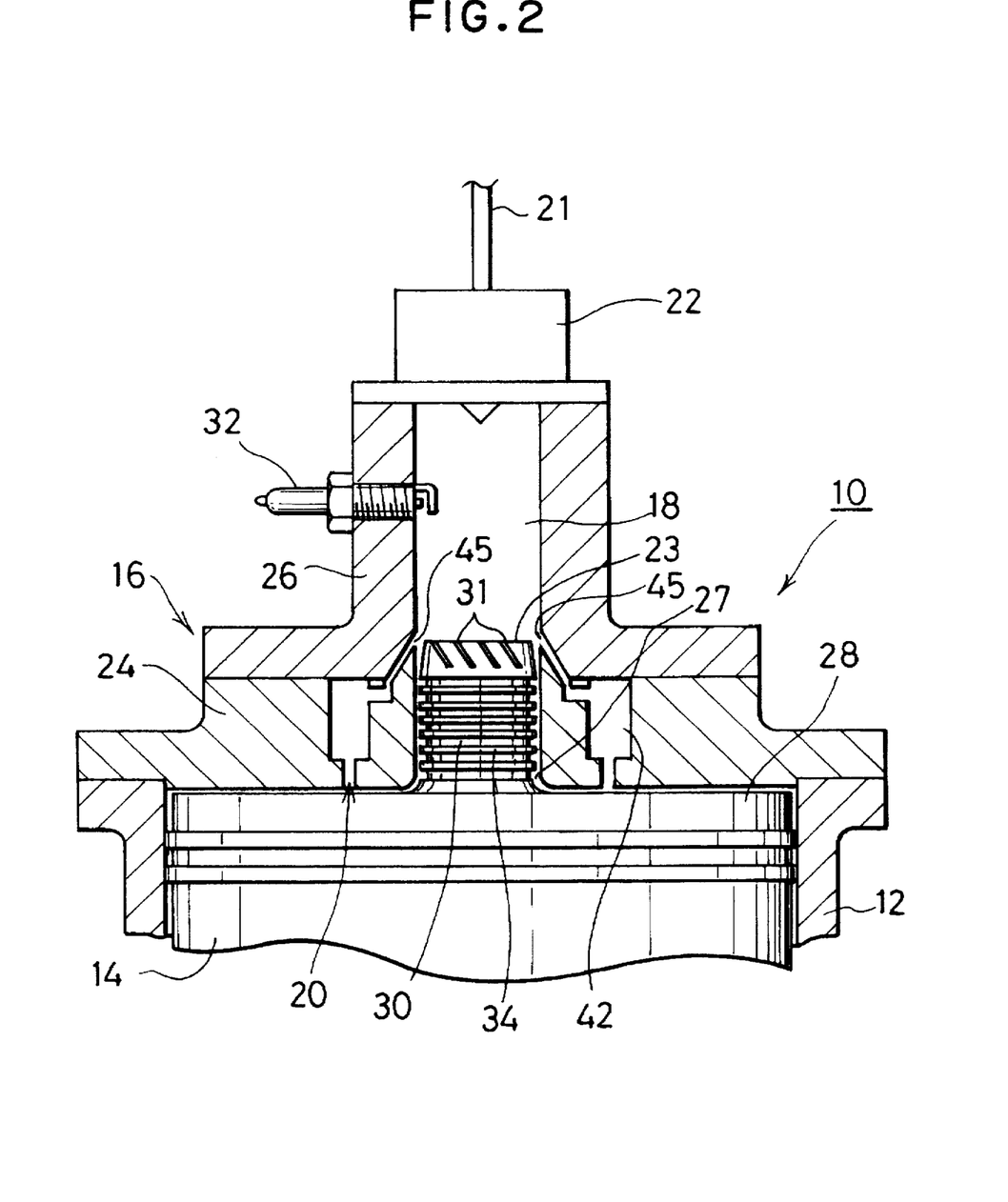
FIG. 2 is a partial sectional view for illustrating a reduced bore combustion chamber of an energy transformation system of a piston cycle with the piston at TDC, according to the embodiment of the invention.

With reference to FIG. 2, an energy transformation system 10 comprises a cylinder 12, a piston 14 which reciprocates between BDC and TDC in the cylinder 12, a reduced bore combustion chamber 18 formed at a head portion 16 of the cylinder 12, a one-way air channels 20 which permits an air flow toward the reduced bore combustion chamber 18 and prevents a reversed flow, and a fuel injection system 22 which injects fuel 21 from above into the reduced bore combustion chamber 18 to combust the fuel 21 in the reduced bore combustion chamber 18 to force the piston 14 down from TDC to BDC, whereby a crankshaft 17(See FIG. 4(a)) connected to the piston 14 via a connecting rod 15(See FIG. 4(a)) is made to rotate to produce power.

The cylinder 12 includes at its head portion a shoulder portion 24 and a reduced bore portion 26 which extends upwardly therefrom in a reduced shape whereby the shoulder portion 24 cooperates with an inner surface of the reduced bore portion 26 to form a reduced bore cylindrical space, while the piston 14 includes a generally cylindrical protrusion portion 30 which is shaped so as to be fitted into the reduced bore portion 26 and extends upwardly from a upper face 28 of the piston 14. A slight clearance between the outer surface of the protrusion portion 30 and the inner surface of the reduced bore portion 26 is provided, as shown in FIG. 2. The bore of the reduced bore portion 26 may be set, for instance, to one fifth of the one of the cylinder 12 below the shoulder 24. This enables the protrusion portion 30 to be kept inserted into the cylindrical space through the predetermined range of crank angles before and after TDC of the piston 14, for instance, 80 deg to 120 deg (See FIGS. 4(b) to 4(d)) to form a reduced bore combustion chamber 18 in the cylindrical space. While the piston 14 moves within that range of crank angles, since the effect of such a reduced bore is to enable the length of the reduced bore combustion chamber 18 to be made much longer than the length of the protrusion portion 30 into the chamber 18, thereby causing the volume change rate of the reduced bore combustion chamber 18 to be lowered during the isolation of the chamber 18 despite the slight movement of the piston 14, the combustion will become closer to a constant volume combustion, as compared with the case where the bore of the chamber 18 is not reduced.

A conventional spark plug 32 is provided on a side portion of the reduced bore portion 26 in the reduced bore combustion chamber 18 so that fuel and highly compressed air can be mixed up with each other to form a fuel mixture, followed by the spark ignition of such resultant fuel mixture.

A plurality of grooves 31 are provided on the upper side surface of the protrusion portion 30 of the piston 14, each of which extends diagonally relative to the moving direction of the piston 14 so that the jet flow of the combustion gas can be suitably created. In addition, a plurality of annular grooves 34 are provided on a side surface of the protrusion portion 30, said grooves 34 extending from the upper surface 28 of the piston 14 to the lower end of the grooves 31 substantially perpendicular to the moving direction of the piston 14 so that the combustion gas can escape from the reduced bore combustion chamber 18 through the annular grooves 34 to adjust the combustion pressure and the combustion temperature in the reduced bore combustion chamber 18 appropriately.

Then, each one-way air channel 20 is formed by penetrating the shoulder portion 24 and cutting out the lower inner corner portion of the reduced bore portion 26, each one-way air channel 20 comprising a diagonal air passage 45 which extends diagonally and upwardly to open into the lower level of the reduced bore combustion chamber 18 and an inserting space 42 which communicates with the diagonal air passage 45 and opens into the interior of the cylinder 12 from above. The inserting space 42 includes a check valve 40 therein (See FIG. 3) which will be explained later. Above construction causes the air compressed by the rise of the piston 14 to be pumped through the one-way air channels 20 into the reduced bore combustion chamber 18 in the upward direction, thereby causing the pumped air to be faced to and mixed up with fuel injected from above into the reduced bore combustion chamber 18 to form a turbulence in the reduced bore combustion chamber 18. In this connection, the oblique angle of the diagonal air passage 45 may be set in such an appropriate way that its outlet opening is not closed by an upper surface 23 of the protrusion portion 30 at TDC, as shown in FIG. 2.

A fuel injection system 22 is basically equivalent to the conventional one adopted in the compressed ignition cycle, so that its detailed description will be omitted. It is adapted to inject fuel from above into the reduced bore combustion chamber 18 at a suitable timing when the piston 14 moves up toward TDC whereby the reduced bore combustion chamber 18 begins to be isolated.

Figure 3:
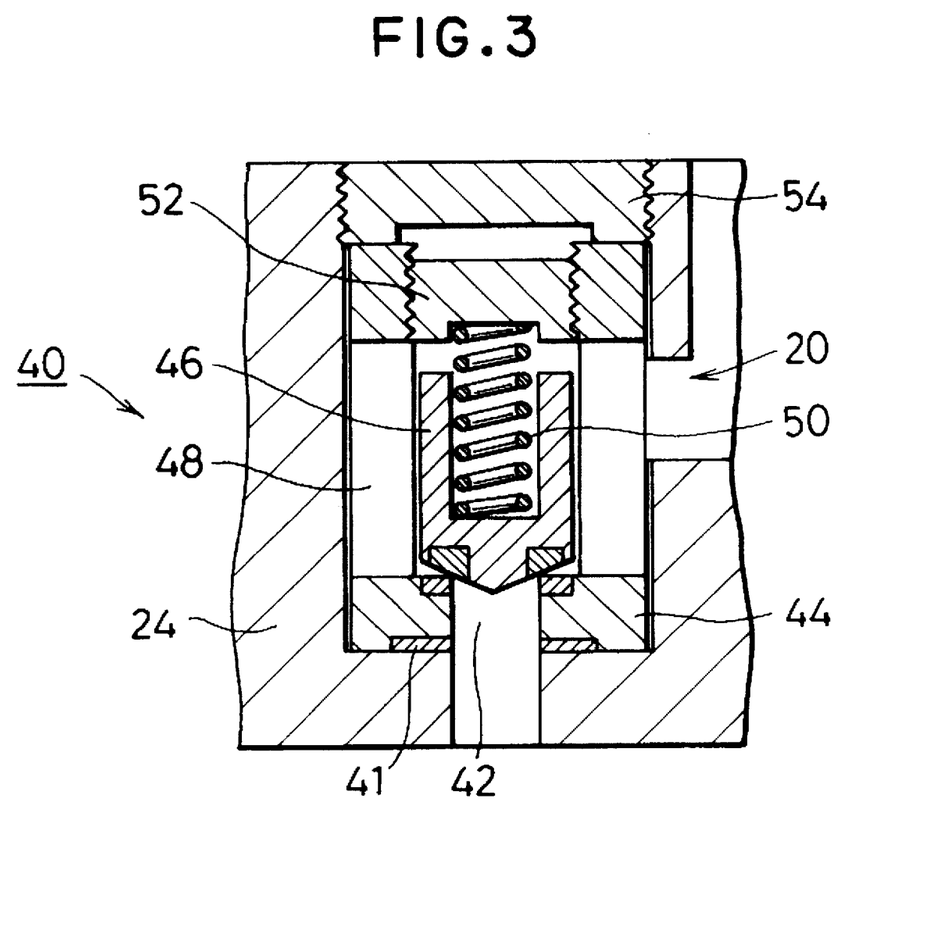
FIG. 3 is a sectional view for illustrating a check valve according to the embodiment of the invention.

Referring now to FIG. 3, each check valve 40 is adapted to be inserted into a corresponding one of the inserting spaces 42 which opens into the side of the reduced bore portion 26 so that the check valve 40 can be easily assembled inside the space 42 before the reduced bore portion 26 is fixed to the shoulder 24.

Each check valve 40 includes a disk-like valve seat 44 with a packing 41 at the inner edge portion of its lower face, a valve body 46 whose tip end portion is shaped conically, an annular guide member 48 which supports and guides the valve body 46, a valve spring 50 for biasing the valve body 46 downwards constantly, a valve spring receiver 52 for locking the valve spring 50 and a fastening screw 54 which is adapted to be threaded into the shoulder portion 24.

This arrangment enables the flow of air toward the reduced bore combustion chamber 18 to be pumped thereinto by overcoming the biasing force in the downward direction of the valve spring 52 when the flow of air reaches the predetermined pressure, while on the other hand, enabling the reversed flow, that is, the one from the reduced bore combustion chamber 18, to be prevented at all times.

Accordingly, the check valve 40 enables air to flow from the interior of the cylinder 12 below the shoulder portion 24 into the reduced bore combustion chamber 18, thereby enabling the pressure in the reduced bore combustion chamber 18 to be increased, while the length of the protrusion portion 30 inserted into the chamber 18 is kept short.

The check valve 40 is assembled as follows. The valve seat 44 is firstly inserted into the inserting space 42 and rested on its bottom, and then the annular guide member 48 is inserted along the outer surface of the inserting space 42, followed by the insertion of the valve body 46 into the interior of the guide member 48. Then, the valve body 46 is biased downward by inserting the valve spring 50, while at the same time the valve spring 50 is, in turn, forced down by the valve spring receiver 52. Finally, the fastening screw 54 is threaded into the shoulder portion 24 to fix the inserted parts, which completes the assembly of the check valve 40.

Figure 4:
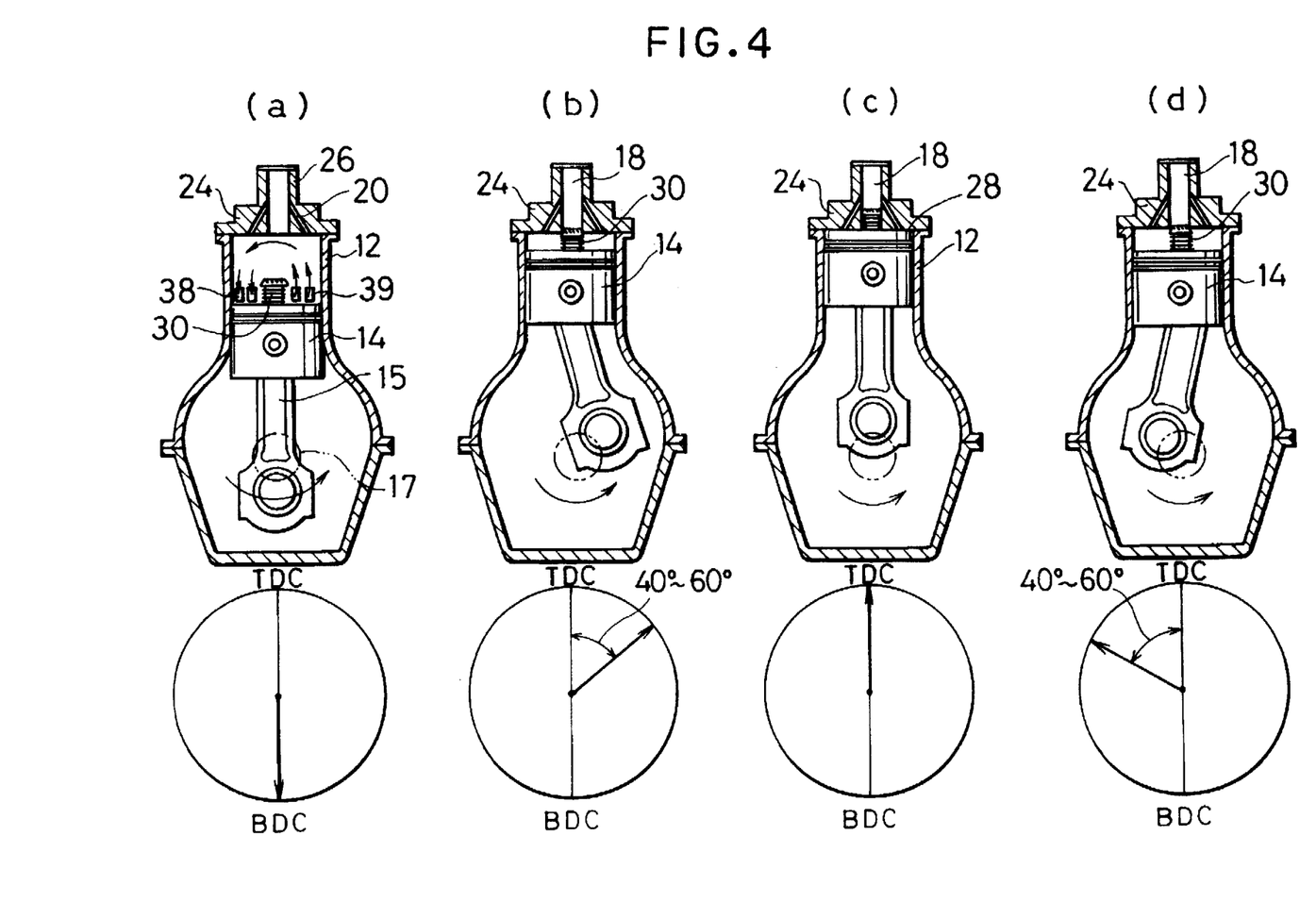
FIG. 4 is a schematic view showing specified cycles and corresponding crank angles of the embodiment of the invention.

The cycle of the energy transformation system 10 which includes the above-configurations will now be described with reference to FIG. 4.

FIG. 4(a) shows the exhaust stroke, in particular, when the piston is at BDC. An exhaustion port 38 and a scavenging port 39 are exposed at BDC so that the gas above the piston 14 flows from the scavenging port 39 upward to the lower face of shoulder 24 where it is deflected downward and flows through the exhaustion port 38, as shown by an arrow in FIG. 4(a). Therefore, residual gas which remains in the reduced bore combustion portion 26 is hardly reeded.

FIGS. 4(b) to 4(c) show the compression stroke in which the piston 14 moves up from BDC to TDC, while at the same time air above the piston 14 becomes compressed. In FIG. 4(b), since the upper surface 23 of the protrusion portion 30 of the piston 14 reaches a level of a lower opening 27 of the reduced bore portion 26 when the crank angle becomes the predetermined angle before TDC, for instance, 40 deg to 60 deg, the reduced bore combustion chamber 18 is formed in the cylindrical space. In this connection, the reduced bore combustion chamber 18 is kept isolated from the interior of the cylinder 12 below the shoulder portion 24 until the crank angle reaches the same angle after TDC as that before TDC.

Then, as shown in FIG. 4(c), the piston keeps on rising toward TDC, which compresses air in the cylinder 12 below the shoulder portion 24, thereby causing compressed air to be pumped into the reduced bore combustion chamber 18 via the one-way air channels 20, while fuel is injected from above by the fuel injection system 22 to form a fuel mixture in the reduced bore combustion chamber 18, followed by ignition by means of the spark plug 32 to start the substantially constant volume combustion.

Then, the combustion temperature and the combustion pressure are both enhanced very rapidly after the start of combustion so that the upper surface 23 of the protrusion portion 30 is forced down. Thereby the combustion gas escapes through the annular grooves 34 provided on the side surface of the protrusion 30, which allows for adjusting appropriately the combustion pressure and the combustion temperature in the reduced bore combustion chamber 18. The variation of combustion pressure during the substantially constant volume process will be described in detail later.

Then, as shown in FIG. 4(d), when the piston 14 reaches the position of the piston 14 equivalent to the one before TDC, preferably 40 deg to 60 deg, the isolation in the reduced bore combustion chamber 18 ends, whereby lowered pressure acts on the upper surface 28 of the piston 14. Therefore, friction force between the piston 14 and the cylinder 12 and the crank bearing load will be reduced, thereby causing the mechanical loss to be greatly decreased.

Then, the piston 14 moves down toward BDC while the crankshaft 17 is rotated, whereby the resultant kinetic rotating energy is utilized as power, which completes the whole cycle. In this connection, intake air may be increased via a turbo-charger by means of exhaust gas. Further, the upper surface 28 of the piston 14 may abut against the inner face of the shoulder portion 24 of the cylinder 12 when the piston 14 reaches TDC, which removes the dead space to enhance the compression ratio. The repetition of above-described cycle causes the thermal energy resulting from the fuel to be transformed into the kinetic rotating energy of the crankshaft.

Figure 5:
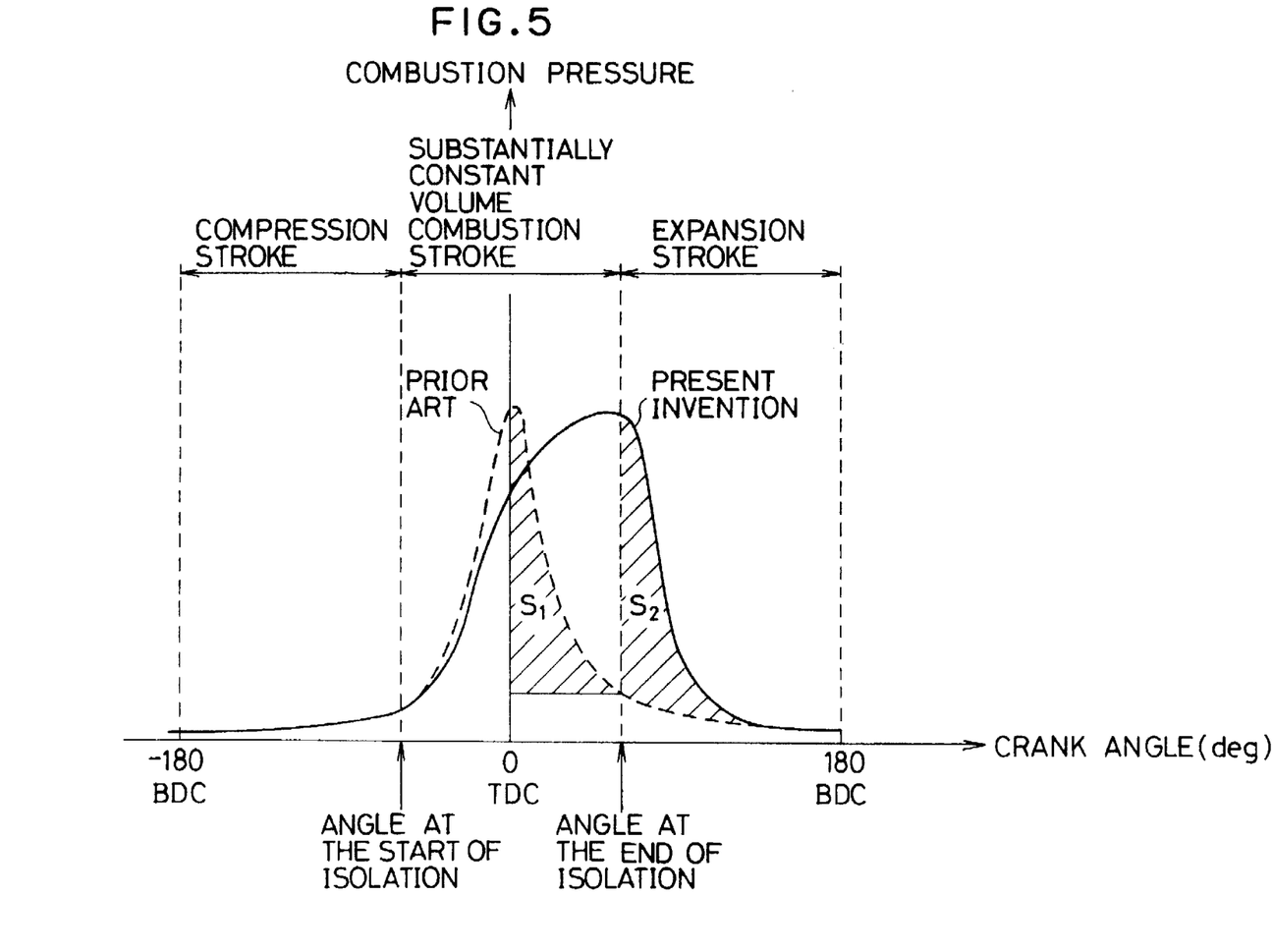
FIG. 5 is a schematic graphic chart showing the variation of the combustion pressure relative to the crank angle according to the piston cycle of the embodiment of the invention.

The substantially constant volume combustion will now be described with reference to FIG. 5. When the piston moves up from BDC to TDC, the tip end of the protrusion portion of the piston reaches the level of the lower end opening of the reduced bore portion of the cylinder, whereby the resultant reduced bore combustion chamber continues to be kept substantially isolated from the interior of the cylinder. Then, the piston continues to ascend toward TDC while fuel injected downwards from the fuel injection system and highly compressed air pumped from below via the one-way air channels become mixed up with each other in the reduced bore combustion chamber to form a fuel mixture, and then such fuel mixture is ignited by means of the spark plug to start a substantially constant volume combustion. On this occasion, as shown in FIG. 5, in contrast with the prior art wherein combustion pressure is maximized at the vicinity of TDC and then it drops down very rapidly, the energy transformation method of the present invention enables the combustion pressure to keep on increasing until the piston begins to move down from TDC to reach the position where the tip end of its protrusion portion descends to the lower end opening of the reduced bore portion of the cylinder again. This is because the reduced bore combustion chamber is kept substantially isolated so that the substantially constant volume combustion can be realized. During the expansion stroke after completion of such an isolation of said chamber, the combustion pressure decreases very rapidly.

similar to the prior art, due to the fact that the reduced bore combustion chamber begins to communicate with the interior of the cylinder again.

In this connection, FIG. 5 is illustrated in such a manner that the feature of the combustion pressure curve of the present invention is emphasized in comparison with the prior art, so that it is to be noted that the combustion pressure value itself plotted in a suitable scale does not have technical significance.

As can been seen from the above description, since the energy transformation method of the present invention allows for the maximum combustion pressure when the piston 14 passes through TDC, it enables the thermal energy to be transformed efficiently to the kinetic rotating energy of the crankshaft without the useless exhaustion of thermal energy at the vicinity of TDC resulting from combustion, which useless exhaustion occurs in the prior art.

Further, if the present invention is applied to a small-sized piston cycle with a small cubic capacity, the effective utilization of residual gas enables the thermal efficiency to be improved, while at the same time enabling environmental pollution to be reduced and/or unit power to be enhanced. In a case of a medium-sized or large-sized piston cycle with a medium or large cubic capacity, the same objects are achieved by supplying the reduced bore combustion chamber with water in addition to effectively utilizing residual gas in order to cope with the resultant raised combustion temperature, thereby utilizing the vaporization heat when water is transmitted into steam vapor, so-called vaporization. More concretely, water fed into the combustion chamber prevents the temperature from being raised due to the increase of the cubic capacity to minimize the generation of NOx, similar to the case of the small-sized piston cycle, and the increase of mass of steam causes the enhancement of a press force acting on the piston to augment power. Furthermore, injecting water heated by an amount of exhaust heat and the heat from the cylinder reduce both the exhaust loss and the cooling loss to contribute to improvement of thermal efficiency.

The preferred embodiment of the present inventions has been described in detail, a spark ignition of a two cycle engine being used as an example. However, it should be noted that the making of various modifications and changes is possible for those skilled in the art without departing from the present claimed invention. For instance, it is needless to say that the present invention is applicable to a four cycle engine, as already described above. Furthermore, the present invention is applicable to a compression ignition. In addition, a substantially constant volume combustion time can be adjusted by adjusting the length of the protrusion portion 30 of the piston 14 appropriately and a stable combustion in accordance with various kinds of fuels such as liquid hydrogen, natural gas, etc., can be attained.

In short, as is apparent from the above-description, according to the present energy transformation method and the system for carrying it out utilizing a piston cycle, whatever the number of cycles or the type of ignition is, the substantially constant volume combustion enables the thermal efficiency to be improved by a high compression ratio and mechanical loss, cooling loss and exhaust loss to be reduced, while at the same time reducing environmental pollution by purifying the exhaust gas through effective utilization of residual gas, etc. and/or increasing the system's unit power by lightening its structural weight.

What we claimed is:

1. A method of energy transformation using a piston-reciprocating cycle, comprising the steps of:

compressing air in a cylinder having an end and an axis, by a piston sliding toward the end of the cylinder where a recessed bore and a shoulder portion are formed, said recessed bore being formed concentrically with the cylinder, said shoulder portion having a one-way air-path leading to the recessed bore, said piston having a projecting portion adapted to be fitted into said recessed bore;

further compressing the air toward top dead center (TDC) wherein the projecting portion of the piston is inserted into the recessed bore so as to highly compress the air in the recessed bore, into which the air flows via the one-way air-path in a direction oblique to the cylinder axis and away from the cylinder;

injecting fuel into the recessed bore in a direction toward the piston to cause turbulence in cooperation with oblique air flow through the one-way air-path, where a fuel mixture of the fuel and the compressed air is formed;

igniting the fuel mixture to cause combustion in the recessed bore, wherein combustion of the fuel mixture is conducted at a substantially constant volume, wherein the combustion pressure is maximized after TDC;

allowing the combustion gas to expand and push the piston, generating an exhaust gas; and discharging the exhaust gas outside the cylinder.

2. The method in accordance with claim 1, wherein a peripheral gap is formed between the projecting portion and the recessed bore when fitted together, and wherein the combustion gas leaks through the gap to adjust the combustion temperature and the combustion pressure during said substantially constant volume combustion.

3. The method in accordance with claim 2, wherein said substantially constant volume combustion is effected under a higher mass ratio of air to fuel than the theoretical mass ratio of air to fuel.

4. The method in accordance with claim 2, wherein said projecting portion has a front surface facing the recessed bore, and a cylindrical side surface, at least said front surface or said cylindrical side surface being provided with grooves, and wherein the combustion gas leaking through the peripheral gap is rendered turbulent by the grooves.

5. The method in accordance with claim 1, wherein the fuel consists of liquid hydrogen.

6. The method in accordance with claim 1, wherein the fuel consists of natural gas.

7. The method in accordance with claim 1, wherein the fuel consists of methanol.

8. An energy transformation system of a piston-reciprocating cycle, comprising:

a cylinder having an end where a reduced bore and a shoulder portion are formed, said reduced bore being formed concentrically with the cylinder having an axis, said shoulder portion having an air channel leading to the reduced bore, said air channel formed in a direction oblique to the axis and provided with a check valve for permitting the air to flow only in a direction from the cylinder to the recessed bore;

a piston reciprocatingly slidable between bottom dead center (BDC) and top dead center (TDC) in the cylinder, said piston having a protrusion portion adapted to be fitted into said reduced bore where the air is compressed when the piston slides toward TDC;

a fuel injector for injecting fuel into the reduced bore in a direction toward the piston to cause turbulence in cooperation with oblique air flow through the air channel, where a fuel mixture of the fuel and the compressed air is formed;

an ignition device for igniting the fuel mixture to cause combustion in the reduced bore, wherein combustion of the fuel mixture is conducted at a substantially constant volume, and wherein the combustion pressure is maximized after TDC; and an exhaust-discharging system for discharging outside the cylinder the exhaust gas generated by the combustion.

9. The system in accordance with claim 8, wherein said protrusion portion includes at its side surface periphery grooves which are substantially perpendicular relative to a moving direction of said piston.

10. The system in accordance with claims 8, wherein said protrusion portion includes at its upper side surface a plurality of grooves which extend diagonally around its periphery relative to the moving direction of said piston.

11. The system in accordance with claim 8, wherein the upper surface of said piston abuts against the inner surface of said shoulder portion when said piston reaches TDC.

12. An energy transformation system of a piston-reciprocating cycle, comprising:

a cylinder having an end where a reduced bore and a shoulder portion are formed, said reduced bore being formed concentrically with the cylinder having an axis, said shoulder portion having an air channel leading to the reduced bore, said air channel formed in a direction oblique to the axis and provided with a check valve for permitting the air to flow only in a direction from the cylinder to the recessed bore;

a piston reciprocatingly slidable between BDC and TDC in the cylinder, said piston having a protrusion portion adapted to be fitted into said reduced bore where the air is compressed when the piston slides toward TDC, wherein said protrusion portion has a front surface facing the reduced bore, and a cylindrical side surface, at least said front surface or said cylindrical side surface being provided with grooves to cause turbulence when combustion gas passes through a peripheral gap formed between the reduced bore and the protrusion portion;

a fuel injector for injecting fuel into the reduced bore, where a fuel mixture of the fuel and the compressed air is formed;

an ignition device for igniting the fuel mixture to cause combustion in the reduced bore, wherein combustion of the fuel mixture is conducted at a substantially constant volume, and wherein the combustion pressure is maximized after TDC; and an exhaust-discharging system for discharging outside the cylinder the exhaust gas generated by the combustion.

13. A method of energy transformation using a piston-reciprocating cycle, comprising the steps of:

compressing the air in a cylinder having an end by a piston sliding toward the end of the cylinder where a recessed bore and a shoulder portion are formed, said recessed bore being formed concentrically with the cylinder having an axis, said shoulder portion having a one-way air-path leading to the recessed bore, said piston having a projecting portion, adapted to be fitted into said recessed bore, having a front surface facing the recessed bore, and a cylindrical side surface, at least said front surface or said cylindrical side surface being provided with grooves to cause turbulence when combustion gas passes through a peripheral gap formed between the recessed bore and the projecting portion;

further compressing the air toward TDC wherein the projecting portion of the piston is inserted into the recessed bore to highly compress the air in the recessed bore, into which the air flows via the one-way air-path;

injecting fuel into the recessed bore, where a fuel mixture of the fuel and the compressed air is formed;

igniting the fuel mixture to cause combustion in the recessed bore, wherein combustion of the fuel mixture is conducted at a substantially constant volume, wherein the combustion pressure is maximized after TDC;

allowing the combustion gas to expand and push the piston, generating an exhaust gas, wherein the combustion gas leaking through the peripheral gap is rendered turbulent by the grooves; and discharging the exhaust gas outside the cylinder.

* * * * *